United States Patent [19]

Sander et al.

[11] 4,389,692

[45] Jun. 21, 1983

[54] OVERLOAD-PROTECTED SWITCHING APPARATUS FOR ELECTRICAL STARTER SYSTEM FOR COMBUSTION ENGINES

[75] Inventors: Klaus Sander, Leonberg; Hans Würth, Ludwigsburg, both of Fed. Rep. of Germany

[73] Assignee: Robert Bosch GmbH, Stuttgart, Fed. Rep. of Germany

[21] Appl. No.: 226,721

[22] Filed: Jan. 21, 1981

[30] Foreign Application Priority Data

Jan. 23, 1980 [DE] Fed. Rep. of Germany ....... 3002232

[51] Int. Cl.[3] ........................ H02H 7/08; H02H 5/04

[52] U.S. Cl. ........................................ 361/29; 361/24; 361/25; 361/26; 361/32; 361/105; 318/783; 310/68 C; 123/179 B; 290/38 R

[58] Field of Search ....................... 361/29, 32, 24, 25, 361/26, 28, 31, 105, 106, 23, 27, 34; 318/783, 782, 791, 384, 430, 136; 310/68 C, 68 B, 68 R; 123/179 M, 179 B, 179 R; 290/38 R, 38 C, 38 D, 38 E, 36 R, 37 A

[56] References Cited

U.S. PATENT DOCUMENTS

| | | | |
|---|---|---|---|
| 3,009,067 | 11/1961 | Janeczko et al. | 290/38 |
| 3,209,206 | 9/1965 | Courtin | 361/106 |
| 3,387,598 | 6/1968 | Almenfors et al. | 123/179 B X |
| 3,695,054 | 10/1972 | Barry | 361/29 X |
| 4,034,265 | 7/1977 | Du Rocher et al. | 361/24 X |

OTHER PUBLICATIONS

"Cranking Motors 40–MT Series", Delco Remy–Sep., 1979, DR-9671.

Bosch–"Technical Instruction Electric Starting Motors", Oct. 1972, VDT-UBE.

*Primary Examiner*—Patrick R. Salce

*Attorney, Agent, or Firm*—Frishauf, Holtz, Goodman & Woodward

[57] ABSTRACT

A thermoswitch is physically located on a portion of the current supply connector between the current source and the exciter winding of the starter motor. The portion, constructed as a simple strip with flaps holding the thermostat, influences the temperature-dependent control portion of the thermoswitch according to heating in the armature, field winding, and brushes of the starter motor. The thermoswitch turns OFF the starter system by interrupting current supply to the kick-in starter relay.

9 Claims, 4 Drawing Figures

OVERLOAD-PROTECTED SWITCHING APPARATUS FOR ELECTRICAL STARTER SYSTEM FOR COMBUSTION ENGINES

The present invention relates to an overload-protected electrical system and structural arrangement for use in combination with starter motors, typically to start automotive-type internal combustion engines, and more particularly to the overload-protective feature thereof.

BACKGROUND

Switching arrangement for electrical starter apparatus for combustion engines with thermal protection are known. Such switching arrangements are used, for example, with remotely or automatically operated starter apparatus, which are controlled by control devices depending, among others, on time and/or motor speed. Thermal overload may occur upon defects in the combustion engine or the starter apparatus. The starter apparatus should be switched OFF at such overloads. To this end, a switching arrangement for a two-step starter apparatus is known in which a thermal switch is included in one of the carbon brushes. Upon exceeding a maximum temperature, it switches the starter apparatus OFF and thus forms a thermal safety device of the main stage upon starting, when the current source supplies full current to the starter motor and the combustion engine is being started. It is known in another switching arrangement for a two-step starter device to arrange a thermal switch in the magnet of the starter kick-in relay. The first stage of the starter sequence is thereby already thermally protected when the kick-in relay for gear connection of the starting pinion receives current. The thermal switch turns OFF the starter apparatus when a maximum temperature in the kick-in relay is exceeded. A combination of the two switching devices is known to protect the pre-stage and the main stage against thermal overload. The switching devices all have the disadvantages that they are expensive and difficult to assemble. Primarily, they are not suitable for small starter arrangements since the space therefor, in the small single elements, is not available.

THE INVENTION

It is an object to provide a thermally protected starter circuit switching network, particularly for automotive-type internal combustion engines, which will thermally protect the starter against overload, which is simple, easy to install and can be readily integrated on or with customary commercial automotive-type starters.

Briefly, a thermostat switch is placed in heat transfer relation to the starter cable terminal, e.g. on a connecting flag or connecting terminal strip which carries current to the starter motor from a current source, typically a vehicle battery, such that the heat-responsive thermal element is in heat-conductive relationship with the connecting strip or flag. One end of the connecting strip or flag is attached to the starter terminal; the other has the starter cable attached thereto, for example by welding or soldering. The heat-responsive element thus is in direct heat transfer to the strip or flag which carries the full starter motor current. The heat-responsive element, typically a snap-type thermostat, controls electrical contacts which are placed, electrically, in circuit with the starter relay coil so that, upon sensing of a temperature of the connecting flag or strip which is above a value representative of excessive current flow, the electrical continuous path to the starter relay is interrupted, thus disconnecting current to the starter winding.

Preferably, the termostatic switch has some hysteresis, that is, does not effect re-connection of the starter winding by an external starter switch until sufficient time has elapsed not only for cooling of the connecting strip or flag, but also of the entire starter motor assembly.

Placing the thermostat switch with its temperature sensing portion in heat transfer relation to the junction of the starter relay contact and the respective supply cable, therefore, provides for a simple arrangement which can easily be attached to existing starter motor assemblies, by merely replacing the connecting flag or strip, or other terminal element between the starter cable and the starter motor by such a thermal element which, additionally, carries the temperature-sensitive portion of the thermostat switch.

The switching arrangement has the advantage that good thermal safety can be obtained simply at easily accessible points even with small single-step electrical starter arrangements.

It is particularly advantageous that the portion which carries the thermostat switch has the main current to the starter motor flowing therethrough. By calibrating the material and its cross section, the switch-off temperature for the thermostatic switch can be determined which is proportional to the maximum permissible temperature in the armature, the exciter winding and the brushes of the starter motor.

DRAWINGS

There is shown in

FIG. 1 the network representation of a switching arrangement for electrical starters, FIG. 2 a portion of a starter arrangement with a kick-in relay and a portion carrying the thermostat switch, FIG. 3 the connecting side of the kick-in relay, and FIG. 4 a view of the portion carrying the thermostatic switch in the direction of the arrow IV of FIG. 3.

DETAILED DESCRIPTION

Figure 1:
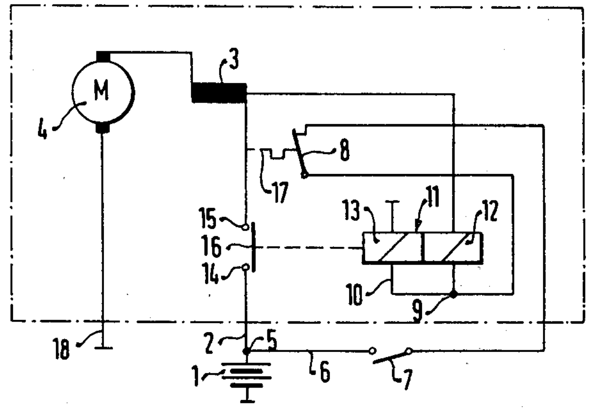
Figure 2:
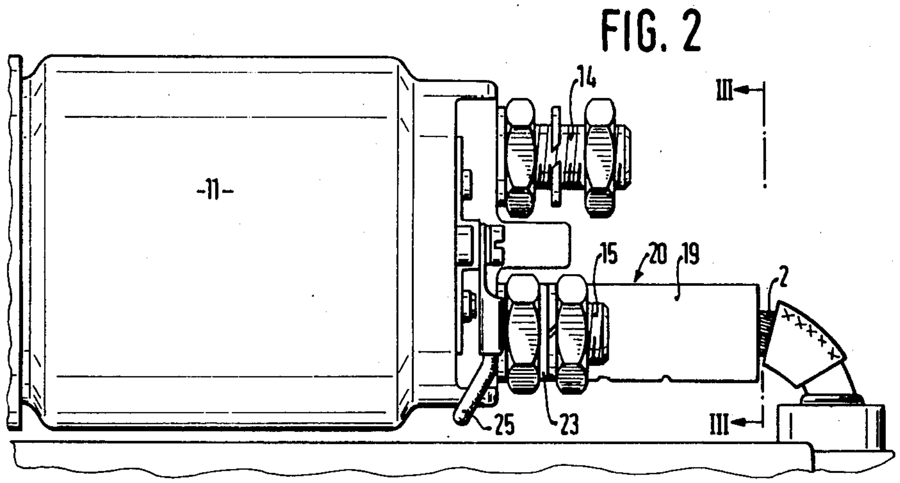
Figure 3:
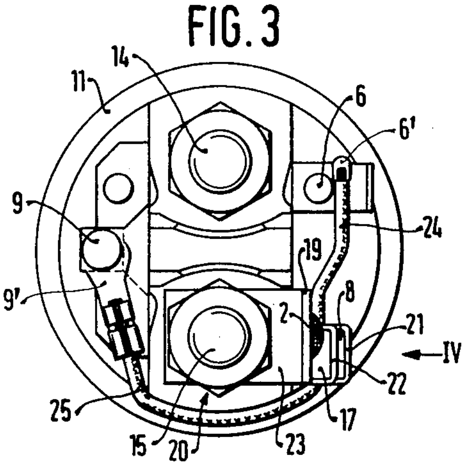

The starter arrangement has a battery 1 as a current source, from the positive terminal of which a supply line 2 leads to an exciter winding 3 of a starter motor 4. A line 6 branches from a junction 5 of the supply line 2, in which a starter switch 7 and a thermostatic switch unit 8 are serially connected. The thermostatic switch unit 8 is constructed as a bi-metal switch which is normally closed and open when a predetermined temperature is exceeded. A line 10 branches from the line 6 at a junction 9. A kick-in relay 11 with a pull-in winding 12 and a holding winding 13 is switched behind the junction 9 in the lines 6 and 10. The line 6 is connected with the pull-in winding 12 and the line 10 with the holding winding 13. The end of line 6 is connected with the exciter winding 5 of the starter motor 4. The end of the line 10 is connected to the negative terminal of the battery.

Two main current terminals 14, 15 are placed in the supply line 2 between the junction 5 and the exciter winding 3. They form the main current switch of the starter arrangement together with a contact bridge 16 of the kick-in starter relay 11. The temperature-dependent control portion 17 of the thermostatic switch 18 is located between the main current carrying contact 15 and the exciter winding 3 on the supply line 2.

The starter motor 4 is connected to the negative terminal of the battery over a line 18.

Figure 4:
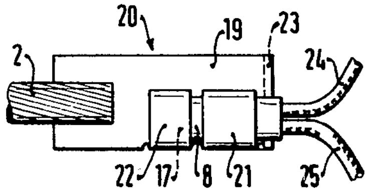

In accordance with a feature of the invention, the thermostatic switch unit 8 is held on a leg 19 (see FIG. 4) of an angled cable terminal 20 by two flaps 21, 22. The supply line 2, formed as a stranded cable, is secured to the end of the leg 19 between the main current terminal 15 and the exciter winding 3. The other leg 23 of the cable terminal 20 is connected to the terminal end of the main current terminal 15, which is threaded, by a thread connection.

A first connecting line 24 from the free end of the thermostatic switch unit 8 is connected with a terminal 6'. The first connecting line 24 is a portion of the line 6 between the starter switch 7 and the thermostatic switch 8. A second connecting line 25, carried out adjacent the first connecting line 24 from the thermostatic switch unit 8 forms the portion of the line 6 between the thermostatic switch 8 and a terminal 9'. The electrical switching circuit of the thermostatic switch unit 8 is separate from the path of power supply to starter motor 3, as can be clearly seen from the wiring diagram of FIG. 1.

The cable terminal 20 thus forms a portion of the supply line 2 through which, when the main current terminals 14, 15, 16 are closed, the full current flows to the starter motor 4 during starting of the combustion engine. The material of the cable terminal and its cross section then are so selected or dimensioned, respectively, that the heat arising in the cable terminal 20 is proportional to the heating of the armature—not further shown, the field winding 3, and the brushes—also not further shown—of the starter motor 4. When a predetermined temperature in the cable terminal 20 is exceeded, which corresponds to the maximum temperature of the starter motor 4, then the temperature-dependent control portion 17 effects opening of the thermostatic switch 8. The line 6 to the starter kick-in relay 11 is thus opened. The starter kick-in relay 11 is disconnected and the contact bridge 16 is lifted off the main current terminals 14 and 15. The main current switch 14 to 16 thus is open, and the current supply from the battery 1 to the starter motor 4, 3 is interrupted. The starter motor 4 will stop until the cable terminal 20 has cooled to a temperature at which the thermostatic switch 8 again closes and and the starter kick-in relay 11 is again connected to the battery 1, provided that the starter switch 7 is also closed.

Various changes and modifications may be made within the scope of the inventive concept.

We claim:

1. Overload-protected electrical starter circuit switching system, particularly for starting of internal combustion engines, and adapted for energization by a current source (1) comprising
   - a supply cable connection including a starter cable (2), a cable terminal (20) on the starter cable, and starter relay contacts (14, 15, 16), said cable terminal being mechanically and electrically connected to one (15) of the starter relay contacts (14–16) connecting the current source (1) to a starter motor (3, 4) through the relay contacts,
   - a relay coil circuit (6,7, 11) including a starter switch (7), connectable to said source (1) for energizing the coil (11, 12, 13) of the relay upon closing of a starter switch (7),
   - a thermostat switch unit (8, 17) having switching contacts connected in the relay coil circuit, and a temperature sensing portion (17);
   - and wherein, in accordance with the invention,
   - the thermostatic switch unit (8, 17) is externally mechanically attached to said cable terminal (20), electrically separate therefrom, and in heat transfer relation thereto, and the switching contacts are connected for disabling the relay coil circuit and hence interrupt current supply to the starter motor upon increase of temperature of the cable terminal beyond a predetermined limit.

2. System according to claim 1, wherein the switching contacts (8) of the thermostatic switch are connected between the starting switch (7) and the coil (12, 13) of the relay (11).

3. System according to claim 1, wherein the temperature sensing portion (17) of the thermostatic switch unit is in heat transfer relation to said cable terminal connecting the exciter winding (3), brushes and an armature of the starter motor to one (15) of the starter relay contacts (14, 15, 16) and hence to the current source (1).

4. System according to claim 1, further including a terminal junction (6') on the starter relay (11, 12, 13), said terminal junction (6') being connected to a first (24) switching connecting line from the thermostatic switch and to a connecting line (6) to said starter switch;
   - and a second terminal (9') forming a junction between a second connecting line (25) from the thermostatic switch terminals (8) to the relay coil (12, 13) of the starter relay.

5. System according to claim 4, wherein the thermostatic switch is a bi-metal switch.

6. System according to claim 1, wherein said cable terminal (20) comprises a strip element (19) having said current supply cable (2) attached to an end portion thereof;
   - a connecting eye (23) is formed on the other end portion of said strip element, said connecting eye being electrically and mechanically attached to one of said starter relay contacts (14, 15); and
   - holding means (21, 22) are provided formed on said strip element and mechanically holding said thermostatic switch (8, 17) in position, said holding means additionally holding the temperature sensing portion (17) of said thermostatic switch in heat transfer relation with the portion of the strip extending between the end portion to which the cable (2) is connected and the connecting eye, so that the heat sensing portion of said thermostatic switch will be in heat sensing relationship with a portion of said terminal carrying current from the source (1) to the starter motor (3, 4).

7. System according to claim 1, wherein the switch unit is a bimetal switch.

8. System according to claim 1, wherein the cable terminal comprises a strip element (19),
   - a first end portion of the strip element being attached to the starter cable (2) and another end portion of the strip element being attached to one of the starter relay contacts;
   - and holding flaps (21, 22) formed on said strip element mechanically securing said thermostatic switch unit (8, 17) in position and further holding said thermostatic switch unit in heat transfer relation with said strip element.

9. System according to claim 8, wherein said flaps clamp the temperature sensing portion (17) of the thermostatic switch unit to place said temperature sensing portion in heat transfer relation to said strip, and hence connect the thermostatic switch unit in thermal relation with the strip which carries electrical current to the exciter winding, the brushes, and the armature of the starter motor to one (15) of the starter relay contacts, and hence to the current source (1) upon energization of the current relay.

* * * * *